United States Patent Office 2,730,536
Patented Jan. 10, 1956

2,730,536

RECOVERY OF ERGOSTEROL

Robert J. Feeney, New York, N. Y., assignor to Chas. Pfizer & Co., Inc., Brooklyn, N. Y., a corporation of Delaware No Drawing. Application May 1, 1952,
Serial No. 285,556

7 Claims. (Cl. 260—397.25)

This invention is concerned with the recovery of ergosterol from fermentation mycelia, in particular of fungi as are used in the production of such products as citric acid, penicillin and yeast.

By utilizing the method of this invention it is possible to isolate ergosterol of very high purity in excellent yields from such fungoid organisms. The process is a relatively simple one wherein the fungoid mycelia are extracted directly with a solvent, preferably without first drying them to remove adherent moisture. The fungoid organisms whose fermentation mycelia may be employed belong to the group of Ascomycetes whose three most important genera are Aspergillus, Penicillium and Saccharomyces.

It has been proposed to recover ergosterol from such fermentation mycelia by extraction processes. However, the prior processes suffer from poor yields. Generally they involve a preliminary treatment of the mycelia to separate the fatty or lipoidal substances from which the ergosterol is then extracted. Thus in the process of Patent No. 2,223,398 to Bennett the fatty or lipoidal substances are first separated by a preliminary step such as plasmolysis or hot acid treatment. In contrast thereto the process of this invention requires no such preliminary separation. This materially assists in obtaining a high quality product, since the many impurities solubilized by such a treatment are not extracted.

According to the present invention the fungus fermentation mycelium is separated from the fermentation broth in the usual manner and is then extracted directly with a partially water-miscible lower aliphatic alcohol at an elevated temperature. It is not even necessary to dry the mycelium; in fact such drying makes the recovery of a good yield difficult. Thus a customary undesirable step of the known recovery procedures is eliminated.

Following repeated direct extraction in our process the separated solvent extracts are concentrated. The concentrates are diluted with sufficient water to form two phases and the conjugated forms of the sterols present are saponified by the use of aqueous caustic and heat. After cooling the mixture, the aqueous phase that separates is discarded and the solvent phase is concentrated so that a dry solvent concentrate is obtained. Certain precipitated impurities are removed from the concentrate and sufficient water is added to saturate the solvent solution of sterols. This results in the crystallization of ergosterol. The product separates in good yield and the purity of the material obtained by the process is particularly high. The material generally possesses a white color and well defined crystalline form. The product is of definitely higher purity and yield than has been obtained by previous processes of comparable simplicity. The particular combination of steps used in the indicated sequence give this unexpected but very desirable result.

In the process of this invention the mycelium of a fungus fermentation is filtered and washed with water. Suitable mycelia are obtained from various mold fermentations, but we have found that the materials produced in preparing citric acid by growth of strains of *Aspergillus niger* on sugar-containing solutions are particularly useful as are *Penicillium chrysogenum* mycelia. After filtration and washing with water, the wet mycelium, which may contain from about 60% to about 80% water, is given no other treatment to release sterols before the solvent extraction. In general, this material should contain about 1% ergosterol (on a dry basis) to make the process practical. However, if an acid fermentation, such as that of citric acid, is used as the source of the mycelium, an alkaline material, such as sodium hydroxide or potassium hydroxide, may be added to substantially neutralize the small amounts of residual acid generally retained by the mycelium. This assists in increasing the stability of the extracted sterols. Alkali is not used in sufficient quantity to cause appreciable saponification of any sterol esters or other conjugated forms of sterols that may be present in the mycelium. The use of excessive alkali results in a very dark extract. The caustic material may be added with the partially miscible alcohol used for extraction. The proportion of caustic required is easily determined. The pH of the mixture should not be appreciably higher than 9.

The alcohol used in this process must be partially miscible with water, and we have found that normal butanol is particularly useful. However, other lower aliphatic alcohols which are partially miscible with water, such as isobutanol or a hexanol, may be used. The extraction may be accomplished by using several portions of the chosen solvent successively. Sufficient solvent is used so that agitation of the mixture, to achieve relatively complete extraction, is not too difficult. The proportion necessary will depend to some extent upon the mycelium used. A water-wet solvent, such as is often obtained in solvent recovery systems, may be used for the extraction. In operating the solvent extraction stage of this process, a counter-current method is useful; that is, a portion of solvent, which has been used to extract a previously extracted portion of mycelium, may be used again to extract successive new portions of mycelium. Thus, the mycelium enters at one end of the system and fresh solvent enters at the other end. There are a series of extractions in which solvent containing more and more of the extracted sterols is successively brought into contact with mycelium containing a higher and higher proportion of unextracted sterols. It has been found that in a batchwise process approximately three portions of about two liters each of solvent per kilogram of wet mycelium has proved quite satisfactory for removing a high proportion of the sterols. During the extraction, the solvent may be heated to increase efficiency of the operation. In general, a temperature of at least about 50° C. and no higher than the boiling point of the wet solvent is preferred. The hot solvent is separated from the mycelium by filtration, centrifugation, or other suitable process.

The solvent extracts may be combined before concentrating or the individual extracts may be concentrated and then combined. Concentration may be accomplished in a variety of suitable apparatus, either continuously or by a batch process. Distillation of the solvent may be accomplished under reduced pressure or at atmospheric pressure. During the concentration, water is added, either continuously or intermittently, so that the solvent is wet at all times. Preferably enough water is present to keep the solvent saturated at the temperature of distillation. Water is, of course, removed with solvent as an azeotrope during distillation. The presence of the water assists in keeping the temperature of the distillation down. When a major proportion of the solvent, that is, at least about 50% and, preferably, about two-thirds, has been removed, the concentrated, wet solvent extract is treated with an equal volume of water. This causes the formation of two phases. Sufficient caustic alkali is then added in order to saponify any conjugated forms of the sterols, such as esters, which may be present. Although sodium hydroxide or other alkali metal hydroxide may be used for this process, potassium hydroxide is particularly useful. If the extracts are combined before concentration, approximately ten grams of potassium hydroxide may be used per kilogram of the original wet mycelium. The mixture is heated, preferably at reflux, for a period of at least about a half hour and not more than about two hours. The mixture is cooled and the aqueous phase is separated and discarded.

The organic solvent phase, which is obtained in this manner, may be washed with water and then with a dilute aqueous solution of a mineral acid and, finally, with a dilute, aqueous solution of a weakly alkaline material, such as sodium bicarbonate. Although these washes are not essential for this process, they do assist considerably in obtaining a product of the highest quality, and there is very little loss in yield.

The wet solvent phase is again concentrated, preferably under vacuum, to about ¼ its original volume. No water is added during this concentration step, so that a dry solvent concentrate is obtained. During the concentration, certain impurities obtained from the original mycelium separate. These may be removed by filtration or by other suitable means. The clarified, dry sterol concentrate is then treated with sufficient water to saturate the solvent. This causes the precipitation of the ergosterol. If the water is added rapidly, there is a tendency for the ergosterol to separate in an amorphous or finely divided form. The mixture may be heated to dissolve the sterol and then gradually cooled to obtain large, well defined, white crystals of ergosterol. This product generally is about 95% pure and, most important, contains practically no other sterols besides the ergosterol. A yield of at least about 60%, and often considerably higher, is obtained. A small additional amount of material may be recovered from the wet solvent from which the sterol crystallizes.

The following examples are given by way of illustration and are not to be considered as the sole embodiments of this invention. It is to be understood that protection hereof is only to be limited by the specific wording of the appended claims.

Example I

Fifteen hundred grams of wet *Aspergillus niger* citric acid fermentation mycelium, containing about 80% moisture, was stirred in a flask equipped with a reflux condenser and containing three liters of wet butanol. The mixture was stirred and refluxed at a temperature of from 94° to 100° C. for one hour. The hot mixture was filtered on a porcelain funnel and the extraction was repeated twice more with the same volume of butanol and under otherwise the same conditions. The combined filtered extracts, which had a volume of about ten liters, contained approximately 90% of the total ergosterol present in the mycelium. The ergosterol was determined by a spectrophotometric method, using the ultraviolet absorption of the sterol.

The combined butanol extracts were concentrated under vacuum with the continuous, slow addition of water until a volume of approximately one liter of solvent was left. One liter of water was added to the solution, together with 15 grams of potassium hydroxide. The mixture was refluxed for one hour at a temperature of approximately 94° C. After cooling, the butanol phase was separated and washed twice with 500-milliliter portions of water. The butanol solution was then concentrated under vacuum to a volume of approximately 160 milliliters. Precipitated, gummy impurities were filtered with the assistance of a diatomaceous earth filter aid. The solid material was washed with a small volume of butanol which was combined with the original filtered concentrate. The butanol solution, having a volume of 170 mls., was treated with 34 mls. of water. The mixture was heated and allowed to cool slowly. After storage overnight in a refrigerator, the product was filtered, washed with a small volume of butanol and dried. It weighed 4.1 grams. This product had a purity of about 90% as determined spectrophotometrically and contained no other sterols besides the ergosterol. A small additional amount of material was obtained from the butanol mother liquor. This material may be purified by crystallization or may be added to the solvent extract obtained in the next batch.

Example II

A portion of wet *Aspergillus niger* citric acid mycelium was extracted with three successive three-liter portions of wet butanol. To each portion of butanol was added five grams of potassium hydroxide before heating the mixture to reflux for the extraction. Each of the extracts was filtered hot, and the three extracts were finally combined. The mixture was concentrated under vacuum to a volume of about 1500 mls. with the continuous addition of water. The concentrated extract was treated with an equal volume of water and then was saponified by the addition of 15 grams of potassium hydroxide and the mixture was refluxed for one hour at its boiling point. The mixture was cooled and the aqueous phase was discarded. The butanol phase was washed successively with 300 mls. of butanol-saturated water, 300 mls. of 1.5% sulfuric acid and 300 mls. of 5% sodium bicarbonate. The butanol phase was again concentrated without the addition of water to about ⅒ its volume. The gummy impurities that separated were filtered and the filtrate was treated with sufficient water to saturate the butanol at room temperature. The mixture was heated to dissolve the product and allowed to cool slowly. The crystalline ergosterol which separated was filtered, washed and dried. Its purity was slightly higher than that obtained by the procedure described in the first example. A spectrophotometric determination indicated a purity of approximately 95% and the absence of any appreciable amount of other sterols.

Example III

A 1500-gram portion of wet *Penicillium chrysogenum* deep tank fermentation mycelium was extracted with three three-liter portions of wet butanol, each containing five grams of potassium hydroxide. The mixture was heated to reflux with stirring for one hour and filtered hot. The three extracts were combined and assayed for ergosterol. It was found that the solution contained 2.06 grams of this sterol. The solution was concentrated to one-eighth its volume with the continuous addition of water. The concentrate assayed 2.00 grams of ergosterol. Five hundred milliliters of water and twenty grams of potassium hydroxide was added. The mixture was refluxed for one hour and the cooled mixture was allowed to separate into two phases. The butanol phase was concentrated under vacuum without the addition of water to a volume of 90 milliliters. Impurities that had precipitated were filtered and the extract was saturated with water at room temperature. The mixture was heated and allowed to cool slowly. Crystalline ergosterol weighing 1.2 grams readily separated.

What is claimed is:

1. A process for the recovery of ergosterol, which comprises extracting a fungus fermentation mycelium with a partially water-miscible lower aliphatic alcohol at an elevated temperature, concentrating the alcoholic extract in the presence of water, adding sufficient water to form distinct organic and aqueous phases, heating the mixture with caustic alkali to saponify the conjugated sterols present, separating the organic solvent phase, concentrating it to a dry solvent concentrate, filtering out the impurities thereby precipitated, saturating the dry filtrate with water, and separating the ergosterol which thereupon precipitates from the wet solvent.

2. A process as claimed in claim 1 wherein the mycelium is that of a citric acid-producing strain of *Aspergillus niger*.

3. A process as claimed in claim 1 wherein the mycelium is that of a strain of *Penicillium chrysogenum*.

4. A process as claimed in claim 1 wherein wet mycelium is extracted with n-butanol at a temperature between about 50° C. and the boiling point of the mixture.

5. A process as claimed in claim 1 wherein wet mycelium is extracted and any residual acid therein is neutralized.

6. A process as claimed in claim 2 wherein the wet, concentrated mycelium extract is washed successively with water, dilute mineral acid and a mildly alkaline solution.

7. A process as claimed in claim 1 wherein the aqueous caustic is an aqueous solution of potassium hydroxide.

References Cited in the file of this patent

UNITED STATES PATENTS

| | | |
|---|---|---|
| 1,842,929 | Bills | Jan. 26, 1932 |
| 2,223,398 | Bennett | Dec. 3, 1940 |
| 2,648,687 | Van Ness | Aug. 11, 1953 |